(12) United States Patent
Liu

(10) Patent No.: US 8,465,234 B2
(45) Date of Patent: Jun. 18, 2013

(54) DRILLING BIT WITH THE DEPTH-LIMITING AND ANGLE-LEADING FUNCTION FOR THE CARPENTER'S WORK

(76) Inventor: Tsai Fa Liu, Taichung (TW)

( * ) Notice: Subject to any disclaimer, the term of this patent is extended or adjusted under 35 U.S.C. 154(b) by 841 days.

(21) Appl. No.: 12/617,706

(22) Filed: Nov. 12, 2009

(65) Prior Publication Data

US 2011/0110740 A1    May 12, 2011

(51) Int. Cl.
  *B23B 49/00*    (2006.01)
(52) U.S. Cl.
  USPC .......................................... 408/202; 408/203
(58) Field of Classification Search
  USPC ......................................... 408/202, 203, 200
  IPC ....................................................... B23B 49/00
  See application file for complete search history.

(56) References Cited

U.S. PATENT DOCUMENTS

| | | | | | |
|---|---|---|---|---|---|
| 1,479,325 | A | * | 1/1924 | Schubnel | 408/202 |
| 2,529,988 | A | * | 11/1950 | Zempel | 408/110 |
| 2,937,544 | A | * | 5/1960 | Forgy et al. | 408/112 |
| 3,060,772 | A | * | 10/1962 | Crump | 408/112 |
| 3,320,832 | A | * | 5/1967 | Jensen | 408/112 |
| 5,092,717 | A | * | 3/1992 | Fischer | 408/59 |
| 5,915,893 | A | * | 6/1999 | Miyanaga | 408/202 |
| 6,203,253 | B1 | * | 3/2001 | Perrault | 408/84 |
| 7,093,368 | B1 | * | 8/2006 | Nelson | 33/18.1 |
| 7,258,513 | B2 | * | 8/2007 | Gertner | 408/67 |
| 7,607,871 | B1 | * | 10/2009 | Nelson | 408/113 |
| 7,654,759 | B2 | * | 2/2010 | Hsu | 400/134 |
| 7,771,143 | B2 | * | 8/2010 | Bharadwaj et al. | 408/1 R |
| 8,052,359 | B2 | * | 11/2011 | Wirth et al. | 408/191 |
| 2010/0215450 | A1 | * | 8/2010 | Santamarina et al. | 408/113 |

* cited by examiner

*Primary Examiner* — Eric A Gates

(57) ABSTRACT

A drilling bit with the depth-limiting and angle-leading function for the carpenter's work, having a covering sleeve (with a driving shaft) and a bit holder for securing a bit. A limit ring and a screw socket (with female thread) are screwable to the covering sleeve (with the male thread) for adjusting the depth of the spot-faced hole in a workpiece (to be drilled) according to the actual operation requirement.

2 Claims, 4 Drawing Sheets

DRILLING BIT WITH THE DEPTH-LIMITING AND ANGLE-LEADING FUNCTION FOR THE CARPENTER'S WORK

BACKGROUND OF THE INVENTION

1. Fields of the Invention

The invention relates to a drilling bit with the depth-limiting and angle-leading function for the carpenter's work, and more particularly, to a structure for adjusting the depth of the spot-faced hole in a workpiece (to be drilled).

2. Description of the Related Art

The drilling bit with the depth-limiting and angle-leading function is specifically employed for electric or pneumatic tools (not shown) for drilling a spot-faced hole in a workpiece. U.S. Pat. No. 7,258,513 teaches such a structure. In taking a closer look at the basic structure according to U.S. Pat. No. 7,258,513, it is found that a countersunk screw (fulfilling a specific clamping effect) has to be loosened when the length of the bit is re-adjusted for determining the depth of the spot-faced hole in a workpiece (after the drilling bit and the covering sleeve are attached to each other). After the adjustment, the countersunk screw has to be tightened back to its original position. The whole process is very complicated and takes up much time. Thus, the requirements of convenience and practicalness are not fulfilled. As a result, a further improvement is required.

SUMMARY OF THE INVENTION

A primary object of the invention is to provide a drilling bit with the depth-limiting and angle-leading function for the carpenter's work that achieve a desired adjustment of the depth of the spot-faced hole in a workpiece, thereby considerably enhancing the real value and the operational convenience.

According to the invention, a limit ring and a screw socket (with female thread) are screwable to the covering sleeve (with the male thread) for adjusting the depth of the spot-faced hole in a workpiece (to be drilled) according to the actual operation requirement.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

The present invention will now be described in more detail hereinafter with reference to the accompanying drawings that show various embodiments of the invention.

Figure 1:
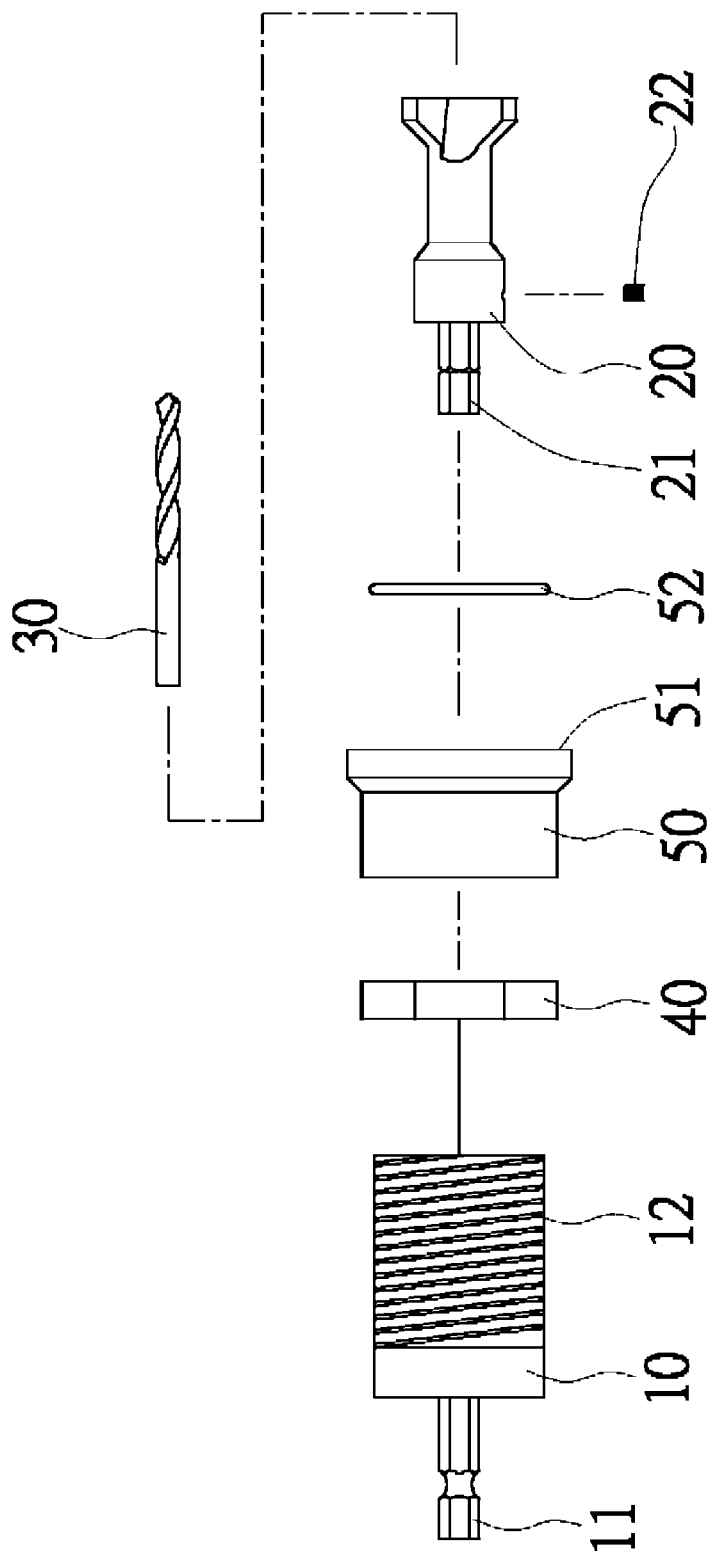
FIG. 1 is an exploded view of the structure of the invention.
Figure 2:
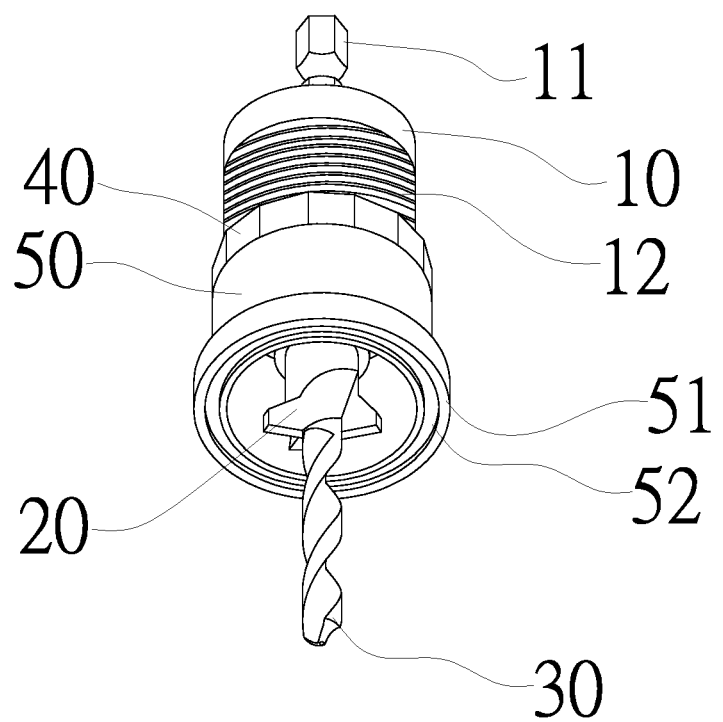
FIG. 2 is a perspective assembly view of the structure according to FIG. 1.

Referring to FIGS. 1 and 2, a structure in accordance with the invention includes a covering sleeve 10 and a bit holder 20.

The covering sleeve 10 includes a driving shaft 11 extending outward for connecting to an electric or pneumatic tool (not shown). The covering sleeve 10 externally includes a male thread 12.

The bit holder 20 includes an insertion shaft 21 at one end thereof for fitting into the driving shaft 11. A bit 30 is connected by a securing screw 22 to the other end of the bit holder 20.

A limit ring 40 and a screw socket 50 with female thread (not shown) are screwed to the covering sleeve 10 with the male thread 12. The screw socket 50 includes a bottom portion 51 adjacent to the bit 30 such that the bottom portion 51 serves as an end stop for determining the drilling depth of the spot-faced hole in the drilling process.

In addition, a rubber washer 52 can be fitted to the bottom portion 51 of the screw socket 50 for preventing the screw socket 50 from direct contact with a workpiece (not shown) to be drilled.

Figure 3:
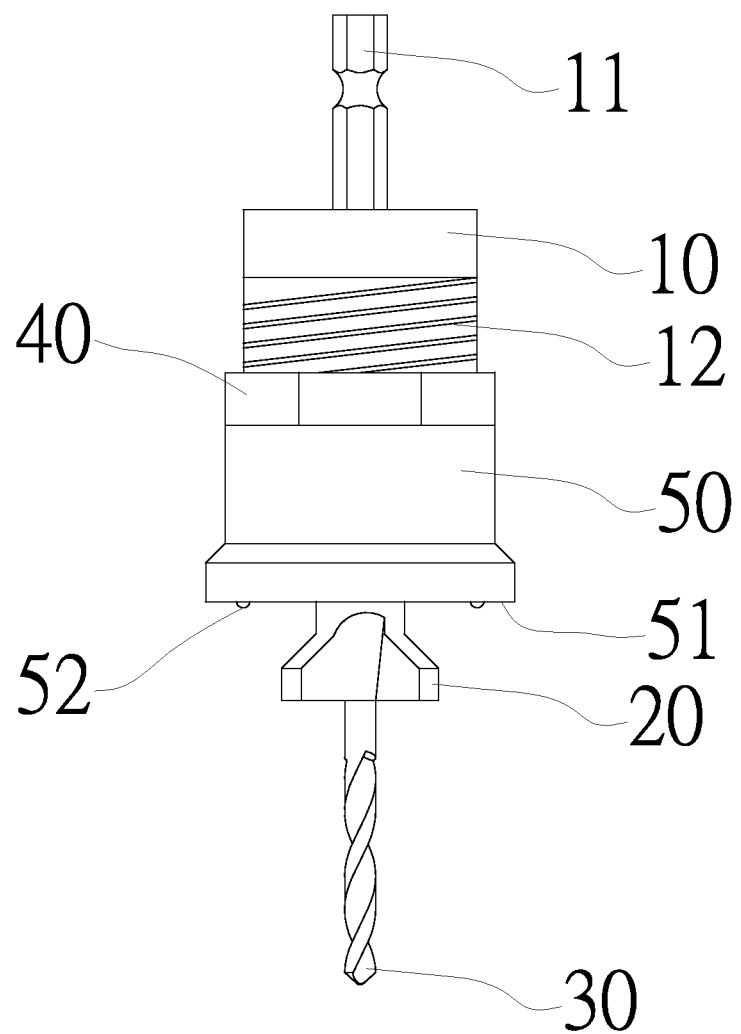
FIG. 3 is a schematic drawing of the assembled structure of the invention.
Figure 4:
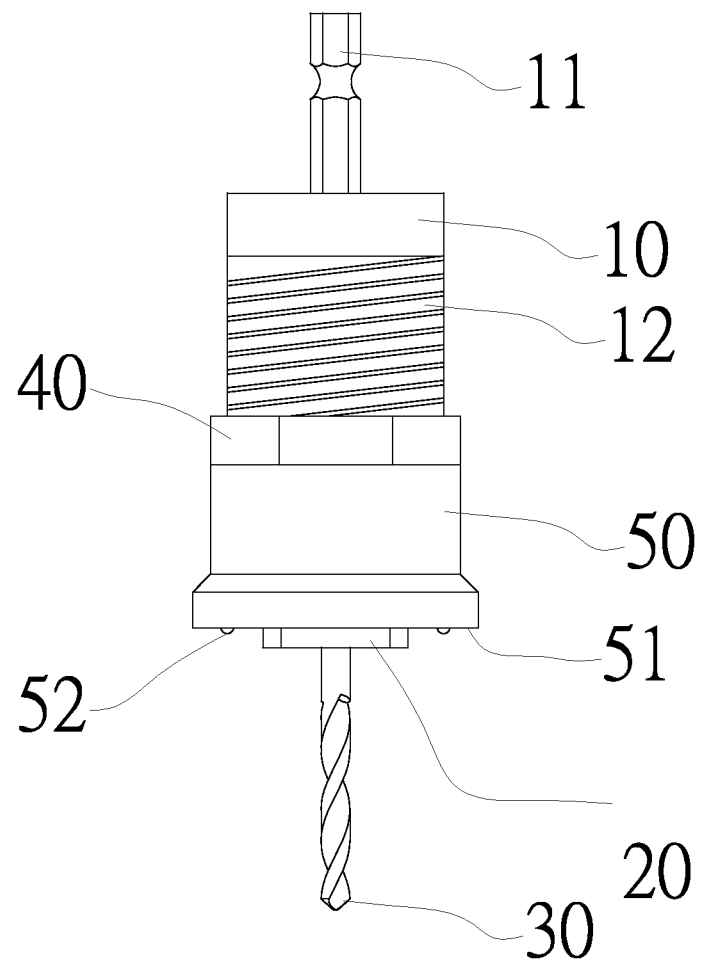
FIG. 4 is a schematic drawing of the structure of the invention after adjustment.

As shown in FIGS. 3 and 4, in adjusting the depth of the spot-faced hole, the operator only requires to screw the screw socket 50 such that the limit ring 40 and the screw socket 50 are pushed against each other.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A drilling bit with a depth-limiting and angle-leading function for carpenter's work, comprising: a) a covering sleeve having a driving shaft extending outward for connecting to an electric or pneumatic tool, the covering sleeve externally further having male threads; and b) a bit holder having an insertion shaft at one end thereof for fitting into the driving shaft, a bit being connected by a securing screw to the other end of the bit holder, wherein an adjustable limit ring and a screw socket with female threads are screwable to the covering sleeve with the male threads, wherein the screw socket includes a bottom portion adjacent to the bit such that the bottom portion serves as an end stop for the drilling operation, whereby the depth of a spot-faced hole in a workpiece is adjustable through the limit ring being configured to be screwed onto the male threads of the covering sleeve to a set depth position and the screw socket being configured to then be advanced until it abuts the adjustable limit ring, wherein the position of the screw socket is variably and toollessly adjustable across the entire length of the male threads of the covering sleeve.

2. The drilling bit with the depth-limiting and angle-leading function for carpenters work as recited in claim 1, wherein a rubber washer can be fitted to the bottom portion of the screw socket.

* * * * *